United States Patent

Strolle

[15] 3,644,261

[45] Feb. 22, 1972

[54] COATING COMPOSITIONS CONTAINING FLUOROCARBON POLYMER AND ALUMINUM BOROPHOSPHATE

[72] Inventor: Clifford Hugh Strolle, Springfield, Pa.

[73] Assignee: E. I. du Pont de Nemours and Company, Wilmington, Del.

[22] Filed: Nov. 3, 1969

[21] Appl. No.: 873,633

[52] U.S. Cl..............260/29.6 F, 117/132 CF, 260/29.6 MM, 260/29.6 MP, 260/32.8 R, 260/33.2 R, 260/33.4 F
[51] Int. Cl........................................................C08f 45/24
[58] Field of Search..................260/29.6 F, 29.6 RU, 33.4 F, 260/32.8 R, 33.2 R

[56] References Cited

UNITED STATES PATENTS

| | | | |
|---|---|---|---|
| 2,562,118 | 7/1951 | Osdal | 260/29.6 |
| 2,917,476 | 12/1959 | Peterson et al. | 260/29.6 |
| 3,213,050 | 10/1965 | Rice | 260/29.6 |

Primary Examiner—Harold D. Anderson
Attorney—John E. Griffiths

[57] ABSTRACT

A composition for priming a surface to improve the adhesion of a fluorocarbon polymer topcoat. The composition contains about 50–90 percent fluorocarbon polymer by weight and 10–50 percent aluminum borophosphate by weight and a liquid carrier.

7 Claims, No Drawings

COATING COMPOSITIONS CONTAINING FLUOROCARBON POLYMER AND ALUMINUM BOROPHOSPHATE

BACKGROUND OF THE INVENTION

This invention relates to coating compositions. It is specifically concerned with primer compositions for improving the adhesion of fluorocarbon polymer coatings to their substrates.

The fluorocarbon polymer coatings when applied to metal, glass or similar type substrates have somewhat less then desirable adhesive traits between the fluorocarbon polymer coatings and the substrate. Therefore, a need developed for a primer composition which would improve adhesion.

SUMMARY OF THE INVENTION

This invention comprises a primer composition consisting of (1) particulate fluorocarbon polymer, (2) aluminum borophosphate and (3) liquid carrier. This primer composition is used to prime the substrate before the fluorocarbon polymer topcoat is applied.

The fluorocarbon polymers are known polymers. They include hydrocarbon monomers completely or partially substituted with fluorine atoms or a combination of fluorine atoms and chlorine atoms. Included in this group are polytetrafluoroethylene, copolymers of tetrafluoroethylene and hexafluoropropylene in all monomer unit ratios, and fluorochlorocarbon polymers such as polymonochlorotrifluoroethylene. Polytetrafluoroethylene is preferred.

The aluminum borophosphate, $Al_2O_3 \cdot B_2O_3 \cdot P_2O_5$, composition is normally 18–22 percent aluminum oxide, 8–12 percent boric anhydride, and 69–71 percent phosphorus pentoxide by weight. The aluminum borophosphate is prepared by an oxide fusing process as is known in the art.

The liquid carrier may be water or an organic liquid miscible with water, such as, ethanol, isopropanol, acetone or a Cellosolve. Water is preferred.

The aluminum borophosphate ordinarily present in the composition constitutes about 10 percent through 50 percent by weight of the aluminum borophosphate and fluorocarbon polymer solids, preferably from about 25 percent through 35 percent.

The liquid carrier ordinarily present in the composition constitutes about 5 percent through 50 percent by weight of the total composition and preferably from about 15 percent through 35 percent.

The composition can be made by mixing in an aqueous solution proper amounts of a fluorocarbon polymer and aluminum borophosphate or, alternatively, the procedure of Example I can be used.

The resulting primer composition can be applied by spraying, brushing, dipping, or roller coating. If the surface to be coated is metal, it is preferably pretreated by grit blasting, by the flame spraying of metals or metal oxides, or by frit coating the substrate after application, the primer coat is air dried and then baked at 450° F. for 20 minutes.

This primer coat is then topcoated with a conventional clear or pigmented fluorocarbon polymer enamel, and baked in the usual way, to give an adherent fluoropolymer coating.

The composition is most useful for priming metal or glass cookware for coating with polytetrafluoroethylene. This primer can also be used to prime many similar type articles for coating with polytetrafluoroethylene. Polytetrafluoroethylene sheeting that has been primed with this material can be bonded to other materials such as metals, plastics or glass.

As a specific example of the composition of this invention the following illustrative examples are given. In these examples all parts are by weight.

EXAMPLE I

A primer composition may be prepared by thoroughly mixing:

| | |
|---|---|
| $Al_2O_3 \cdot P_2O_5 \cdot H_2O$ (available as Monsanto's Alkophos) aluminum oxide 11%, phosphous pentoxide 36%, water 53% (47.1% solids) | 23.1 |
| Boric acid dispersion (13.2% boric acid and 31.8% pigment) (46.0% solids) in water | 13.6 |
| Surfactant (available as DuPont's Duponol) (30.0% solids) | 2.1 |
| Polytetrafluoroethylene dispersion (60.0% solids) in water | 61.2 |
| Total: | 100.0 |

A physical mixing of Alkophos ($Al_2O_3 \cdot P_2O_5 \cdot H_2O$) with boric acid produces aluminum borophosphate ($Al_2O_3 \cdot P_2O_3 \cdot P_2O_5$).

An aluminum sheet is cleaned. The sheet is then sprayed with the primer composition to a thickness 0.2 to 0.3 mil (dry). The sheet is then baked for 20 minutes at 450° F. after which it is topcoated with a dispersion of polytetrafluoroethylene having the following composition:

| | |
|---|---|
| Polytetrafluoroethylene nonionic aqueous dispersion (60% solids) | 37.0 |
| Polytetrafluoroethylene anionic aqueous dispersion (60% solids) | 13.5 |
| Polytetrafluoroethylene anionic aqueous dispersion (35% solids) | 14.4 |
| Surfactant (available as Du Pont's Duponol) (30% solids) | 6.5 |
| Pigment Dispersion in water (30% solids) | 7.5 |
| Silicone Dispersion in water (39.7% solids) | 10.7 |
| Toluene | 10.4 |
| Total: | 100.0 |

The topcoat is sprayed over the primer to a total thickness of 1.2 to 1.4 mils (dry) and then baked at 750° F. for 20 minutes.

The resulting coating of polytetrafluoroethylene adheres well to the aluminum substrate.

The invention claimed is:

1. A fluorocarbon primer composition consisting essentially of:
   a. from 50 percent through 90 percent by weight of particulate fluorocarbon polymer;
   b. from 10 percent through 50 percent by weight of aluminum borophosphate, the percentages by weight being based on the combined weight of the solids of said fluorocarbon polymer and said aluminum borophosphate, said aluminum borophosphate being comprised of from 18–22 percent aluminum oxide, 8–12 percent boric anhydride, and 69–71 percent phosphorous pentoxide by weight, and
   c. a liquid carrier selected from the group consisting of water and water-miscible organic liquids.

2. The composition of claim 1 containing from 65 percent through 75 percent fluorocarbon polymer, 25 percent through 35 percent aluminum borophosphate and from 5 percent through 50 percent liquid carrier.

3. The composition of claim 1 wherein the fluorocarbon polymer is polytetrafluoroethylene.

4. The composition of claim 2 wherein the fluorocarbon polymer is polytetrafluoroethylene.

5. The composition of claim 1 wherein the aluminum borophosphate is in the ratio by weight of 18.2 percent to 21.4 percent aluminum oxide, 8.6 percent to 11.6 percent boric anhydride, and 70 percent phosphorus pentoxide based on the total amount of aluminum borophosphate.

6. The composition of claim 1 wherein the liquid carrier is water.

7. The composition of claim 2 wherein the liquid carrier is water.

* * * * *